United States Patent
Huang et al.

(10) Patent No.: US 12,287,311 B2
(45) Date of Patent: Apr. 29, 2025

(54) SYNCHRONOUS AND DYNAMIC LOADING METHOD IN ELECTRO-MAGNETO-THERMO-MECHANICAL MULTI-FIELD COUPLING CONDITIONS

(71) Applicant: Hefei Institutes of Physical Science, Chinese Academy of Sciences, Hefei (CN)

(72) Inventors: Liansheng Huang, Hefei (CN); Xiaojiao Chen, Hefei (CN); Shiying He, Hefei (CN); Xiuqing Zhang, Hefei (CN); Chuan Li, Hefei (CN)

(73) Assignee: Hefei Institutes of Physical Sciences, Chinese Academy of Sciences, Hefei (CN)

( * ) Notice: Subject to any disclaimer, the term of this patent is extended or adjusted under 35 U.S.C. 154(b) by 416 days.

(21) Appl. No.: 18/057,523

(22) Filed: Nov. 21, 2022

(65) Prior Publication Data
US 2023/0160798 A1 May 25, 2023

(30) Foreign Application Priority Data
Nov. 22, 2021 (CN) .......................... 202111389470.8

(51) Int. Cl.
*G01N 3/317* (2006.01)

(52) U.S. Cl.
CPC ....... *G01N 3/317* (2013.01); *G01N 2203/005* (2013.01); *G01N 2203/0226* (2013.01); *G01N 2203/0676* (2013.01)

(58) Field of Classification Search
None
See application file for complete search history.

(56) References Cited

U.S. PATENT DOCUMENTS 5,195,378 A * 3/1993 Ferguson ................. G01N 3/10
73/790
2020/0116660 A1* 4/2020 Pettit ...................... G01N 25/12

* cited by examiner

*Primary Examiner* — Quynh H Nguyen
(74) *Attorney, Agent, or Firm* — DLA PIPER LLP (US)

(57) ABSTRACT

Disclosed is a synchronous and dynamic loading method in electro-magneto-thermo-mechanical multi-field coupling conditions. The method comprises the following steps: applying maximum pulse current to a test object by a pulse power supply to realize loading in extreme electric field and magnetic field conditions; meanwhile, generating a large amount of friction heat by the high-speed rotation of a rotating body and the friction of the test object to realize loading in an extreme-temperature field combined with a large amount of Joule heat and arc heat; synchronously applying pressure to the rotating body by a pressure device to realize loading of extreme force combined with the gravity of the rotating body and the friction force between the rotating body and the test object.

4 Claims, 1 Drawing Sheet

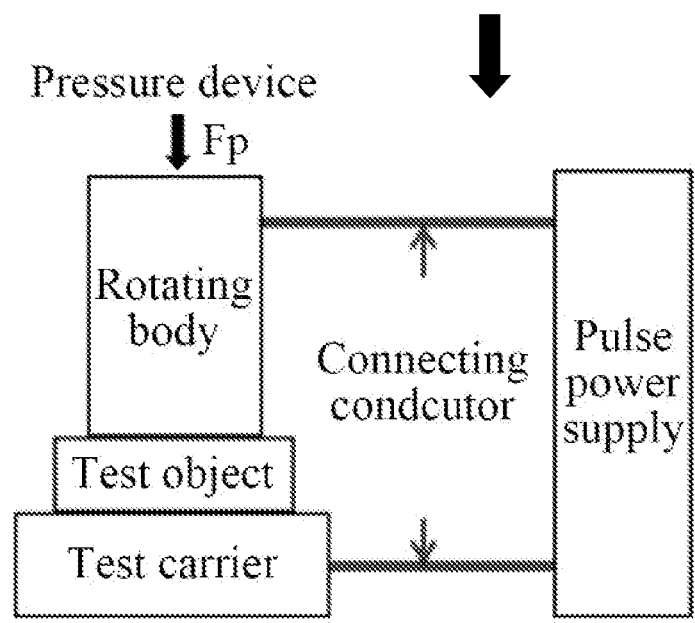

SYNCHRONOUS AND DYNAMIC LOADING METHOD IN ELECTRO-MAGNETO-THERMO-MECHANICAL MULTI-FIELD COUPLING CONDITIONS

CROSS-REFERENCE TO RELATED APPLICATIONS

This application claims priority to Chinese Application Serial No. 202111389470.8, filed Nov. 22, 2021, the content of which is incorporated herein by reference in its entirety.

TECHNICAL FIELD

The present disclosure relates to the technical field of multi-load synchronous loading, and specifically relates to a synchronous and dynamic loading method in electro-magneto-thermo-mechanical multi-field coupling conditions.

BACKGROUND

In the fields of extreme electromagnetic energy, material science, research and application of high-end equipment, the conditions that the pulse current is the maximum (tens of kiloamperes and above), the current density is $10^8$ A/m$^2$ and above, the temperature rise rate is not less than $10^4$ K/s and the strain rate is not less than $10^4$ s$^{-1}$ may appear synchronously. In the electro-magneto-thermo-mechanical extreme conditions, there are enormous challenges to meet the material performance, and the damage phenomena and mechanism of the materials in the environment are not clear. The existing electro-magneto-thermo-mechanical synchronous loading device can only realize partial synchronous loading in some electro-magneto-thermo-mechanical conditions (some conditions are combined in steady state or at low parameters), cannot solve the synchronous loading problem in multi-field coupling extreme conditions of electricity, magnetism, temperature and stress, and cannot meet the scientific research and test requirements of extreme electromagnetic energy, material science and high-end equipment in national defense and industry.

SUMMARY

The present disclosure aims to provide a synchronous and dynamic loading method in electro-magneto-thermo-mechanical multi-field coupling conditions. The method comprises the following steps:

step one, making preparations to install a test carrier, a rotating body, a pulse power supply and a pressure device, fixing the test object on the test carrier, and respectively connecting the pulse power supply with the test carrier and the rotating body through connecting conductors, wherein the rotating body is positioned above the test object, the pressure device is arranged above the rotating body, and pressure is applied to the rotating body;

step two, turning on the pulse power supply to apply maximum pulse current to the test object to realize loading under extreme electric field and magnetic field conditions; simultaneously driving the rotating body to rotate at a high speed, so that the rotating body rubs against the test object to generate friction heat, and realizing loading in an extreme-temperature field combined with Joule heat and arc heat; and synchronously applying pressure to the rotating body by the pressure device, and realizing loading of the extreme force combined with the gravity and electromagnetic force of the rotating body and the friction force between the rotating body and the test object; and step three, measuring the pulse current, the pulse voltage, and the temperature, stress and electromagnetic signals of the test object in real time, and regulating and controlling the output current of the pulse power supply, the rotating speed of the rotating body, the output pressure of the pressure device to realize synchronous and dynamic loading in electro-magneto-thermo-mechanical multi-field coupling conditions.

As further optimization of the above-mentioned scheme, in the second step, maximum current density is realized by regulating and controlling the pulse current and rotating speed of the rotating body.

As further optimization of the above-mentioned scheme, the current density depends on the pulse current, the contact area and the material properties, and the current density is calculated by the relationship among the current, the contact area and the current density.

As further optimization of the above-mentioned scheme, the calculation formula of the current density is as follows:

$$J = \frac{I}{S};$$

wherein, I is pulse current, S is the area of a single contact point, J is current density; wherein, $$S = \frac{F}{n\zeta H},$$

n is the number of conductive spots, is correction factor, and H is contact hardness.

As further optimization of the above-mentioned scheme, in the second step, the Joule heat and arc heat of the pulse current are regulated and controlled by the output current of the pulse power supply, the output pressure of the pressure device and the rotating speed of the rotating body, and the maximum temperature rise rate is realized through the combined action of friction heat.

The device has the beneficial effects that loading in electro-magneto-thermo-mechanical coupling conditions difficult for engineering realization is converted into current, initial pressure and rotating speed variables convenient to regulate and control, and the synchronous and dynamic loading in electro-magneto-thermo-mechanical multi-field coupling conditions is realized by changing the pressure and regulating and controlling the current and rotating speed in real time.

Firstly, by comprehensively controlling the physical quantities such as the output current of the pulse power supply, the rotating speed of the rotating body and the output pressure of the pressure device, synchronous and dynamic loading in electro-magneto-thermo-mechanical multi-field coupling extreme conditions can be realized, the extreme test environment in which the electric field, magnetic field, temperature field and stress field are coupled with one another is effectively simulated, and necessary conditions are provided for scientific research and test requirements of extreme electromagnetic energy, material science and high-end equipment in national defense and industry.

Secondly, the pulse current, the pulse voltage, and the temperature, stress and electromagnetic signals of the test object can be measured in real time, and the output current of the pulse power supply, the rotating speed of the rotating body, the output pressure of the pressure device are synchronously controlled, so that the test requirements in electro-magneto-thermo-mechanical multi-field coupling extreme conditions are dynamically realized.

BRIEF DESCRIPTION OF THE DRAWINGS

The attached FIGURES serve to provide further understanding of the present disclosure and constitute a part of the specification, together with embodiments of the present disclosure, serve to explain the present disclosure and do not constitute limitation of the present disclosure. In the attached FIGURES, FIG. 1 is a system schematic diagram of a synchronous and dynamic loading method in electro-magneto-thermo-mechanical multi-field coupling conditions in the embodiment.

DETAILED DESCRIPTION OF THE EMBODIMENTS

The present disclosure is further described in conjunction with the specific embodiments. The embodiments are merely used for illustrating the present disclosure without limiting the scope of the present disclosure.

The embodiment provides a synchronous and dynamic loading method in electro-magneto-thermo-mechanical multi-field coupling conditions. The method comprises the following steps:

step one, referring to FIG. 1, making preparations to install a test carrier, a rotating body, a pulse power supply and a pressure device, and respectively connecting the pulse power supply with the test carrier and the rotating body through connecting conductors, wherein the pressure device is arranged above the rotating body, and pressure is applied to the rotating body;

step two, fixing the test object on the test carrier, wherein the rotating body is positioned above the test object;

step three, turning on the pulse power supply to apply maximum pulse current to the test object to realize loading under extreme electric field and magnetic field conditions; simultaneously driving the rotating body to rotate at a high speed, so that the rotating body rubs against the test object to generate friction heat, and realizing loading in an extreme-temperature field combined with Joule heat and arc heat; and synchronously applying pressure to the rotating body by the pressure device, and realizing loading of the extreme force combined with the gravity and electromagnetic force of the rotating body and the friction force between the rotating body and the test object; and step four, measuring the pulse current, the pulse voltage, and the temperature, stress and electromagnetic signals of the test object in real time, and regulating and controlling the pulse current output by the pulse power supply, the rotating speed of the rotating body, the output pressure of the pressure device to realize synchronous and dynamic loading in electro-magneto-thermo-mechanical multi-field coupling conditions.

According to the synchronous and dynamic loading method in electro-magneto-thermo-mechanical multi-field coupling conditions in the embodiment, loading in electro-magneto-thermo-mechanical coupling conditions difficult for engineering realization is converted into current, initial pressure and rotating speed variables convenient to regulate and control, and the synchronous and dynamic loading in electro-magneto-thermo-mechanical multi-field coupling conditions is realized by changing the pressure and regulating and controlling the current and rotating speed in real time.

Further, according to the loading method, the output current of the pulse power supply and the rotating speed of the rotating body are regulated and controlled, and the maximum pulse current flowing through the test object is controlled to reach tens of kiloamperes and above, and the current density reaches $10^8$ A/m$^2$ and above. According to the loading method, the rotating speed of the rotating body and the output pressure of the pressure device are further regulated and controlled, the heat generated by friction is controlled, and the control for the temperature rise rate of the surface of the test object is realized combined with Joule heat and arc heat of pulse current, so that the temperature rise rate reaches $10^4$ K/s or more. Further, the pressure output by the pressure device is regulated and controlled, and the control for the strain rate of the test object is realized combined with the effects of friction, electromagnetic force and thermal stress, so that the strain rate can reach $10^4$ s$^{-1}$ and above.

Further, the current density depends on the pulse current, the contact area and the material property, and the maximum pulse current is applied to the test object by the pulse power supply. The calculation formula of the current density is as follows:

$$J = \frac{I}{S}$$

(I is pulse current, S is the area of a single contact point, and J is current density), wherein $$S = \frac{F}{n\zeta H}$$

(n is the number of conductive spots, $\zeta$ is correction factor, H is contact hardness, and F is contact pressure).

Further, according to the method, the temperature heat source of the load comes partly from friction heat, partly from Joule heat and partly from arc heat. Combined with Joule heat and arc heat of the pulse current, the output pressure of the pressure device and the rotating speed of the rotating body are regulated and controlled, the heat generated by friction is controlled, and the temperature rise rate of the surface of the test object is controlled to reach $10^4$ K/s or above. The temperature rise rate is affected by the factors such as applied pressure, the rotating speed of the rotating body, pulse current and material properties.

Specifically, the heat generated by friction depends on material properties, pressure and the relative sliding speed between the rotating body and the test object. The calculation formula of heat flux $q_f$ generated by friction force is as follows: $q_f = \mu F v$ ($\mu$ is dynamic friction coefficient, F is contact pressure, and v is relative sliding speed). Joule heat depends on pulse current, material properties, pressure, the arc curvature of rotating body and other factors. The calculation formula of contact resistance heat flux $q_r$ is as follows:

$$q_r = \frac{I^2(\rho_1 + \rho_2)\zeta H}{4n\alpha F}$$

(I is pulse current, $\rho_1$ and $\rho_2$ are resistivity of two contact materials, $\zeta$ is correction coefficient, H is contact hardness, n is the number of conductive spots, $\alpha$ is the radius of conductive spots, and F is contact pressure). The arc heat depends on pulse current, material properties, contact state and other factors. Under the action of arc heating, the temperature rise of the surface of the test object changes along with distance and time, and can be attributed to the strong transient heat conduction problem of a semi-infinite object heated rapidly by constant heat flow. The calculation formula of heat flux density $q_w$ of arc heat is as follows:

$$q_w = q|_{x=0} + t_0 \frac{\partial q}{\partial t}\bigg|_{x=0}$$

(t is time, x is distance). The strain rate is affected by pulse current, the rotating speed of the rotating body, applied pressure, temperature rise rate and material properties. The electromagnetic stress, friction force and pressure applied on the test object are controlled by regulating the output current of the pulse power supply, the rotating speed of the rotating body and the output pressure of the pressure device, and combined with the regulation and control of temperature rise rate and the material properties, the thermal stress of the test object is controlled to generate extreme strain rate conditions for the test object.

Although the present disclosure has been described in detail with reference to the foregoing embodiments, for those skilled in the art, modifications may still be made to the subject matter recited in the foregoing embodiments, or equivalents may be substituted for some of the technical features thereof. Any modification, equivalent replacement, or improvement made without departing from the spirit and principle of the present disclosure shall fall within the protection scope of the present disclosure.

What is claimed is:

1. A synchronous and dynamic loading method in electro-magneto-thermo-mechanical multi-field coupling conditions, comprising:

making preparations to install a test carrier, a rotating body, a pulse power supply and a pressure device, fixing a test object on the test carrier, and respectively connecting the pulse power supply with the test carrier and the rotating body through connecting conductors, wherein the rotating body is positioned above the test object, the pressure device is arranged above the rotating body, and pressure is applied to the rotating body;

turning on the pulse power supply to apply maximum pulse current to the test object to realize loading under extreme electric field and magnetic field conditions; simultaneously driving the rotating body to rotate at a high speed, so that the rotating body rubs against the test object to generate friction heat, and realizing loading in an extreme-temperature field combined with Joule heat and arc heat; and synchronously applying pressure to the rotating body by the pressure device, and realizing loading of an extreme force combined with gravity and an electromagnetic force of the rotating body and the friction force between the rotating body and the test object; and measuring the pulse current, a pulse voltage, and the temperature, stress and electromagnetic signals of the test object in real time, and regulating and controlling an output current of the pulse power supply, the rotating speed of the rotating body, the output pressure of the pressure device to realize synchronous and dynamic loading in electro-magneto-thermo-mechanical multi-field coupling conditions;

wherein during the turning, the Joule heat and arc heat of the pulse current are regulated and controlled through the output current of the pulse power supply, the output pressure of the pressure device and the rotating speed of the rotating body, and a maximum temperature rise rate is realized through a combined action of friction heat.

2. The synchronous and dynamic loading method in electro-magneto-thermo-mechanical multi-field coupling conditions according to claim 1, wherein during the turning, maximum current density is realized by regulating and controlling the pulse current and rotating speed of the rotating body.

3. The synchronous and dynamic loading method in electro-magneto-thermo-mechanical multi-field coupling conditions according to claim 2, wherein the current density depends on the pulse current, a contact area and material properties, and the current density is calculated by the relationship among the current, the contact area and the current density.

4. The synchronous and dynamic loading method in electro-magneto-thermo-mechanical multi-field coupling conditions according to claim 3, wherein a calculation formula of the current density is as follows:

$$J = \frac{I}{S};$$

wherein, I is pulse current, S is the area of a single contact point, J is current density; wherein, $$S = \frac{F}{n\zeta H},$$

n is a number of conductive spots, $\zeta$ is correction factor, H is contact hardness, and F is contact pressure.

* * * * *